United States Patent
Hamada et al.

(10) Patent No.: US 7,362,019 B2
(45) Date of Patent: Apr. 22, 2008

(54) VEHICLE ALTERNATOR

(75) Inventors: Hiroshi Hamada, Anjo (JP); Yoshinori Hayashi, Toyohashi (JP); Mikio Mashino, Kariya (JP); Yoshitaka Kondou, Oobu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/585,196

(22) Filed: Oct. 24, 2006

(65) Prior Publication Data

US 2007/0108855 A1 May 17, 2007

(30) Foreign Application Priority Data

Nov. 14, 2005 (JP) ............... 2005-328694

(51) Int. Cl.
*H02K 7/00* (2006.01)

(52) U.S. Cl. ..................... 310/68 D; 310/64

(58) Field of Classification Search .............. 310/68 D, 310/64; 363/141, 142, 145
See application file for complete search history.

(56) References Cited

U.S. PATENT DOCUMENTS

| | | | |
|---|---|---|---|
| 5,376,877 A * | 12/1994 | Kern et al. ............... | 322/32 |
| 5,659,212 A * | 8/1997 | DePetris ................. | 310/68 D |
| 5,689,404 A | 11/1997 | Katsui | |
| 6,060,802 A * | 5/2000 | Masegi et al. ............ | 310/68 D |
| 6,426,575 B1 | 7/2002 | Masegi et al. | |
| 6,538,352 B2 * | 3/2003 | Asao ...................... | 310/68 D |
| 7,019,424 B2 * | 3/2006 | Aeschlimann et al. .... | 310/68 D |
| 7,105,976 B2 * | 9/2006 | Stewart et al. ........... | 310/218 |
| 2002/0043885 A1 * | 4/2002 | Asao et al. ............... | 310/90 |
| 2002/0053841 A1 * | 5/2002 | Asao ...................... | 310/68 B |
| 2003/0133318 A1 * | 7/2003 | Radosevich et al. ...... | 363/131 |
| 2003/0141854 A1 * | 7/2003 | Kuribayashi et al. ..... | 322/28 |
| 2004/0183385 A1 * | 9/2004 | Takahashi et al. ........ | 310/68 D |
| 2004/0256924 A1 * | 12/2004 | Ueda et al. .............. | 310/60 A |
| 2004/0256925 A1 * | 12/2004 | Morrissette et al. ...... | 310/68 B |
| 2005/0035673 A1 * | 2/2005 | Lafontaine et al. ....... | 310/58 |
| 2005/0127763 A1 * | 6/2005 | Fischer et al. ........... | 310/68 D |
| 2005/0146236 A1 * | 7/2005 | Kashihara ............... | 310/68 D |
| 2006/0043805 A1 * | 3/2006 | Bradfield ................. | 310/68 D |
| 2006/0208581 A1 * | 9/2006 | Ikuta et al. .............. | 310/58 |

FOREIGN PATENT DOCUMENTS

| | | |
|---|---|---|
| JP | A 7-274440 | 10/1995 |
| JP | A 11-164518 | 6/1999 |
| KR | 0217553 B1 | 3/2000 |

* cited by examiner

*Primary Examiner*—Dang Li
(74) *Attorney, Agent, or Firm*—Oliff & Berridge, PLC

(57) ABSTRACT

A vehicle alternator for generating electric power has a stator, a rotor, a rectifier, a regulator case, and a cooling fin part. A stator winding is wound on the stator. The rotor is placed on opposite faces to the stator. The rectifier rectifies an alternating current output voltage excited in the stator winding. The regulator case accommodates a regulator substrate for adjusting the output voltage and a heat sink. On one surface of the heat sink the regulator substrate is mounted. The cooling fin part has plural cooling fins bonded to the other surface of the heat sink. The cooling fin part and the heat sink are made of a same material of a superior thermal expansion coefficient, such as copper or copper alloy.

4 Claims, 7 Drawing Sheets

VEHICLE ALTERNATOR

CROSS-REFERENCE TO RELATED APPLICATIONS

This application is related to and claims priority from Japanese Patent Application No. 2005-328694 filed on Nov. 14, 2005, the contents of which are hereby incorporated by reference.

BACKGROUND OF THE INVENTION

1. Field of the Invention

The present invention relates to a vehicle alternator equipped with a regulator of an improved adhesion condition between a heat sink and cooling fins, and the vehicle alternator is mounted on a vehicle such as a passenger car or a truck.

2. Description of the Related Art

Recently, the mounting space of a vehicle alternator has become more and more limited because of reduction in engine-mounting space in a vehicle caused by a tendency for a slant-nosed design of the front part of a vehicle for reducing running resistance of a vehicle such as air resistance and the need to enlarge a vehicle compartment space.

Further, in order to increase the fuel consumption of a vehicle, the number of revolutions of or a rotation speed of a vehicle alternator is reduced in an idling condition and the number of revolutions of an engine is also reduced. However, there is on the contrary a strong requirement to further increase the generation capability of an electric power of the vehicle alternator because of electronic loads such as various control devices for use in safety control. Thereby, the demand for a small sized and higher output power vehicle alternator has grown, for example, the size of a stator of a vehicle alternator is 152 mm or less, and the output power of the vehicle alternator is not less than 2.4 kW.

In order to satisfy such a demand, it is necessary to reduce the resistance of a stator winding, to decrease an air gap between a stator and a rotor of a vehicle alternator, and to increase the magnitude of an exciting current. However, the temperature of various components forming the vehicle alternator is thereby increased and the thermal energy thereof deteriorates those components. There are various countermeasures against the increased thermal energy so as to decrease the temperature of the components in the conventional vehicle alternators, namely, to increase the cooling capability thereof. For example, Japanese patent laid open publication NO. JP H7-274440 has disclosed the structure to enhance the cooling capability of a regulator in a vehicle alternator having an improved arrangement of cooling fins. The improved arrangement of the cooling fins mounted on the regulator achieves an adequate flow speed and provides a sufficient amount of flow rate of cooling air. (In particular, see page 2 and is FIG. 1 to FIG. 5 of JP H7-274440)

In general, a heat sink for a regulator is made of copper or copper alloy which has a high thermal conductivity or a high electric conductivity, and cooling fins are made of aluminum from the point of view of easy working and of reducing a manufacturing cost. Still further, silicon adhesive of high thermal resistance is used as bonding agent for bonding the heat sink and the cooling fins. However, because the heat sink is different in material from the cooling fins and those materials have a different thermal expansion coefficient to each other, thermal stress is more increased, in particular, the thermal stress to the adhesive surface between them is more increased by the tendency toward the high output power where both operation are repeated, one is the state of performing the electric power generation of the vehicle alternator driven by an engine of a vehicle and the other is the state of halting the electric power generation. This introduces the difficulty to maintain the adhesion between the cooling fins and the heat sink over a long time and thereby decreases the reliability of the vehicle alternator. The deterioration of the adhesion condition between them causes malfunction of the electric power generation of the vehicle alternator because the radiating capability of the regulator becomes worse.

SUMMARY OF THE INVENTION

It is an object of the present invention to provide a vehicle alternator with a high reliability equipped with a regulator of an improved adhesion condition between a regulator heat sink and a regulator cooling fin part, mounted on a vehicle.

According to an aspect of the present invention, there is provided a vehicle alternator for generating electric power. The vehicle alternator has a stator, a rotor, a rectifier, a regulator case, and a cooling fin part. On the stator a stator winding is wound. The rotor is placed on opposite faces to the stator. The rectifier rectifies an alternating current (A.C.) output voltage excited in the stator winding. The regulator case accommodates a regulator substrate and a heat sink. The regulator substrate includes electric circuits capable of adjusting the output voltage. The regulator substrate is mounted on one surface of the heat sink. The cooling fin part has plural cooling fins bonded to the other surface of the heat sink. In particular, the cooling fin part and the heat sink are made of a material having a same thermal expansion coefficient.

The thermal stress applied to the bonding material through which the cooling fin part is bonded to the heat sink can be reduced by making the cooling fin part and the heat sink of the regulator with one or more materials which is a same thermal expansion coefficient. This feature maintains the good bonding state between the heat sink and the cooling fin part over a long time and thereby enhances the reliability of the vehicle alternator according to the present invention.

According to another aspect of the present invention, there is provided a vehicle alternator in which both of the cooling fin part and the heat sink are made of copper or copper alloy. By making the cooling fin part and the heat sink of the regulator with copper or copper alloy of a superior thermal expansion coefficient, it is possible to achieve both the reduction of thermal stress and the increase of the cooling capability, and thereby to enhance the reliability of the vehicle alternator. For example, when compared with the vehicle alternator in which both the cooling fin part and the heat sink are made of aluminum, it is possible to greatly increase the cooling capability of the vehicle alternator according to the present invention.

"Still further, according to another aspect of the present invention, there is provided the vehicle alternator in which an outer diameter of the stator is not more than 152 mm, and a rated output power of the vehicle alternator is not less than 2.4 kW. Even if the vehicle alternator is a large sized vehicle alternator and has a large rated output, it is possible to certainly maintain the improved bonding condition between the regulator heat sink and the regulator cooling fin part, and thereby possible to have both the high reliability and the large output of the vehicle alternator."

"Still further, according to another aspect of the present invention, there is provided the vehicle alternator in which an outer diameter of the stator is not more than 152 mm and a rated output power of the vehicle alternator is not less than 2.4 kW. Even if the vehicle alternator is a large size and a large output, it is possible to maintain the connection state between the regulator heat sink and the regulator cooling fin part certainly and thereby possible to achieve both the high output capability and a high reliability of the vehicle alternator."

BRIEF DESCRIPTION OF THE DRAWINGS

A preferred, non-limiting embodiment of the present invention will be described by way of example with reference to the accompanying drawings, in which.

DETAILED DESCRIPTION OF THE PREFERRED EMBODIMENT

Figure 1:
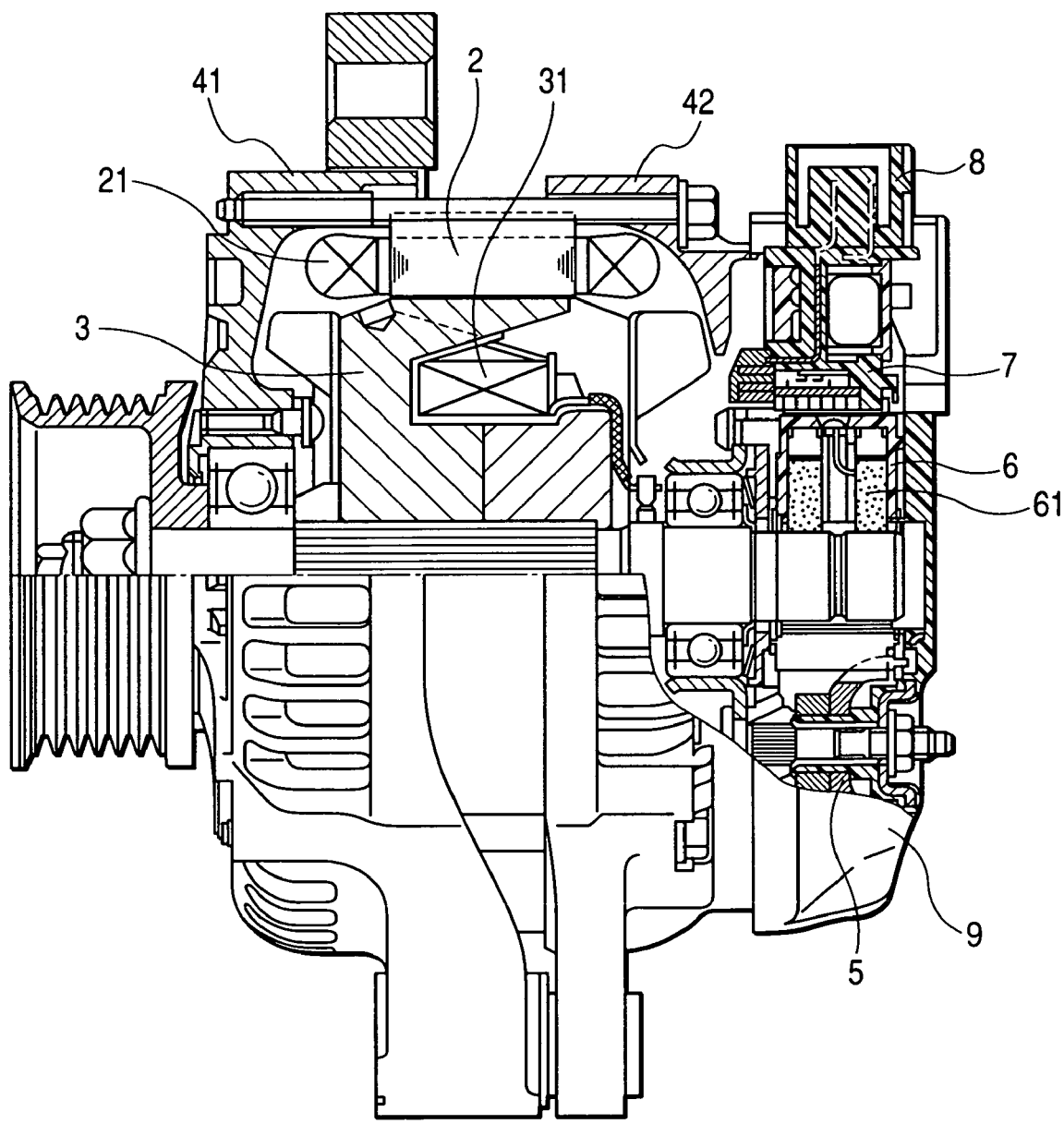
FIG. 1 is a schematic view of an entire configuration of a vehicle alternator according to an embodiment of the present invention.

Hereinafter, various embodiments of the present invention will be described with reference to the accompanying drawings. In the following description of the various embodiments, like reference characters or numerals designate like or equivalent component parts throughout the several diagrams.

EMBODIMENT

A description will be given of the vehicle alternator according to the embodiment of the present invention with reference to FIG. 1 to FIG. 7.

Figure 2:
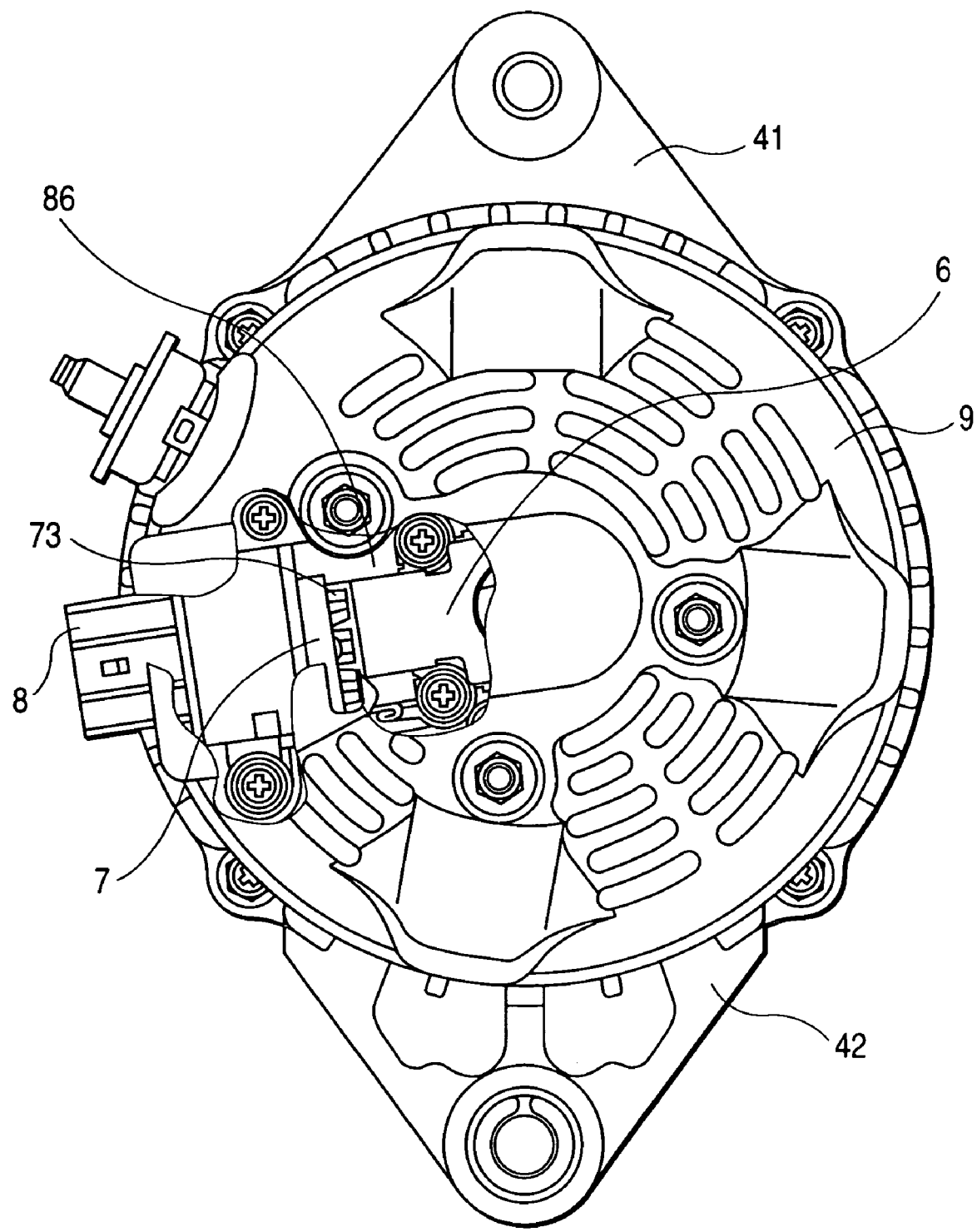
FIG. 2 is a rear view of the vehicle alternator according to the embodiment shown in FIG. 1.

FIG.1 is a schematic view of an entire configuration of the vehicle alternator according to the embodiment of the present invention. FIG. 2 is a rear view of the vehicle alternator shown in FIG. 1.

As shown in FIG. 1 and FIG. 2, the vehicle alternator 1 has a stator 2, a rotor 3, a front housing 41, a rear housing 42, a rectifier device 5, a brush device 6, a regulator case 7, a connector case 8, and a rear cover 9.

The stator 3 acts as an armature having a stator winding 21. The rectifier device 7 rectifies the three-phase output current from the stator winding 21 and provides a rectified direct current. The rotor 3 acts as a field magnet, which is composed of two parts that are placed on opposite faces to each other. The front housing 41 and the rear housing 42 support the stator 2 and the rotor 3. The rectifier device 5 rectifies the alternator voltage induced in the stator winding 21. The brush device 6 has a brush 61 through which a field current is provided to the field winding 31 in the rotor 3. The regulator case 7 controls the magnitude of an output voltage of the vehicle alternator 1. The connector case 8 has connectors through which electrical signals are transferred between the vehicle alternator 1 and an external control device (omitted from the drawings) mounted on a vehicle. The regulator is composed of the regulator case 7, the connector case 8, and a regulator substrate and the like. (The regulator substrate will be described in detail later.) For example, the embodiment of the present invention used the vehicle alternator 1 of a large size in which the outer diameter of the stator 2 is 152 mm or less and its rated output is not less than 2.4 kW.

Figure 4:
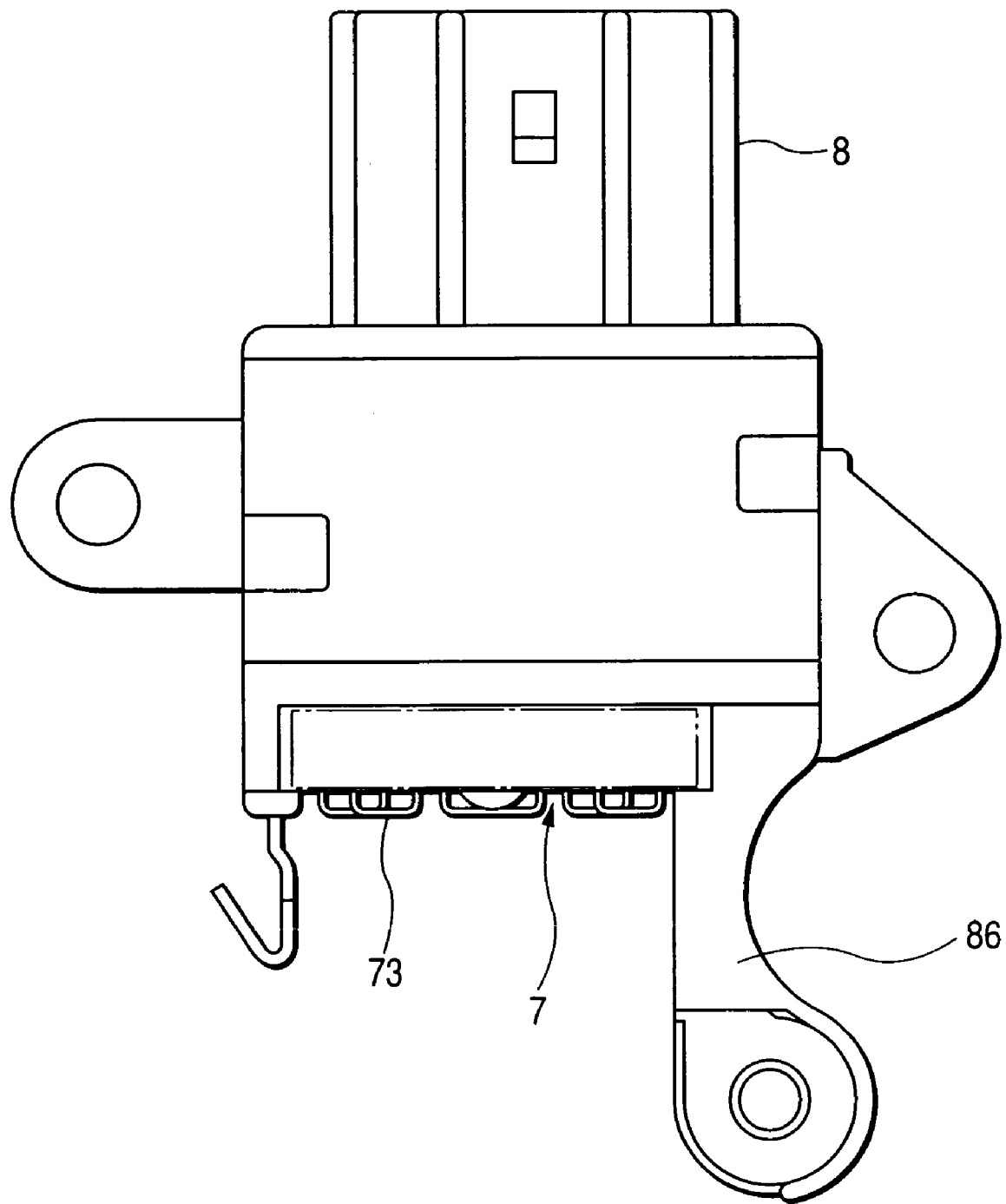
FIG. 4 is a side view of the regulator incorporated into the vehicle alternator shown in FIG. 3.
Figure 5:
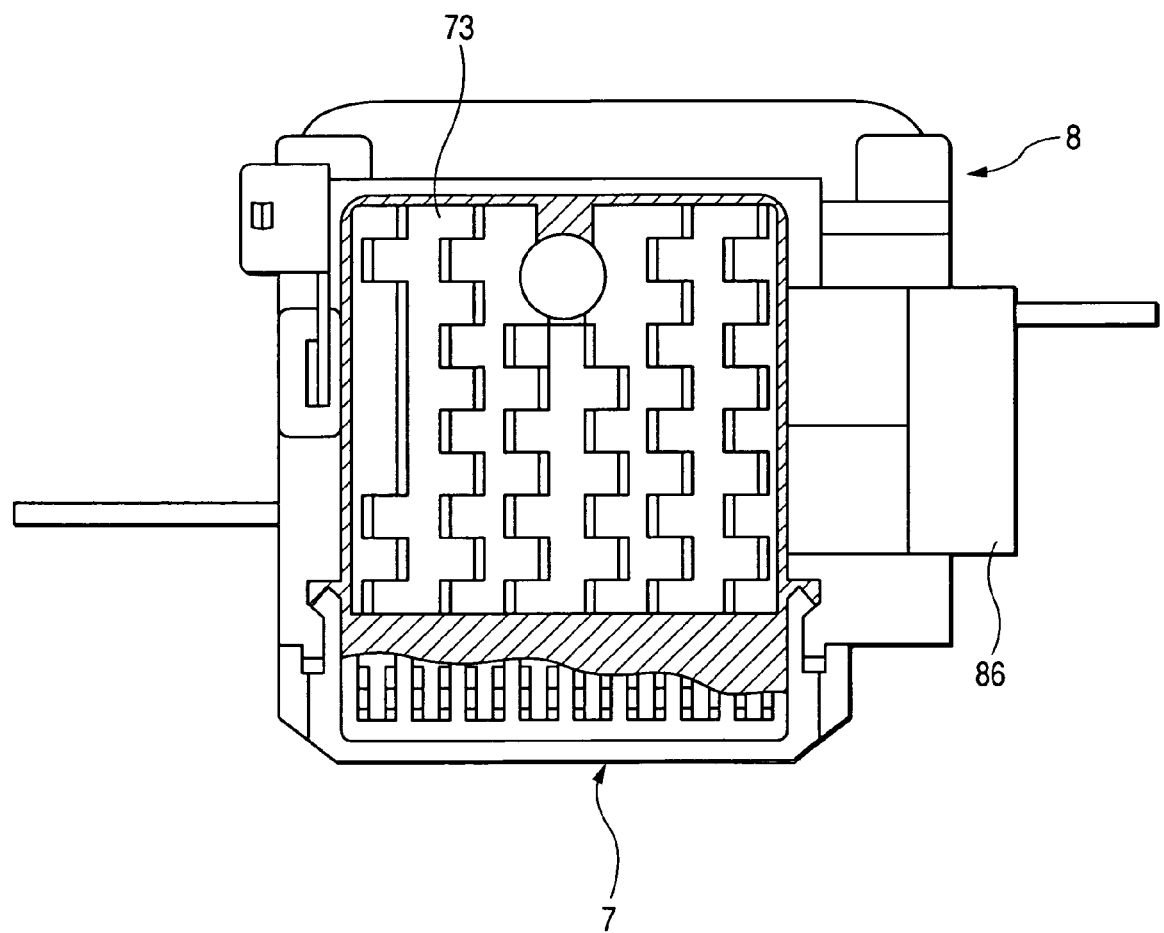
FIG. 5 is a front view of the regulator incorporated into the vehicle alternator shown in FIG. 3.

Next, a description will now be given of the detailed configuration of the regulator composed of the regulator case 7 and the connector case 8 with reference to FIG. 3, FIG. 4, and FIG. 5.

Figure 3:
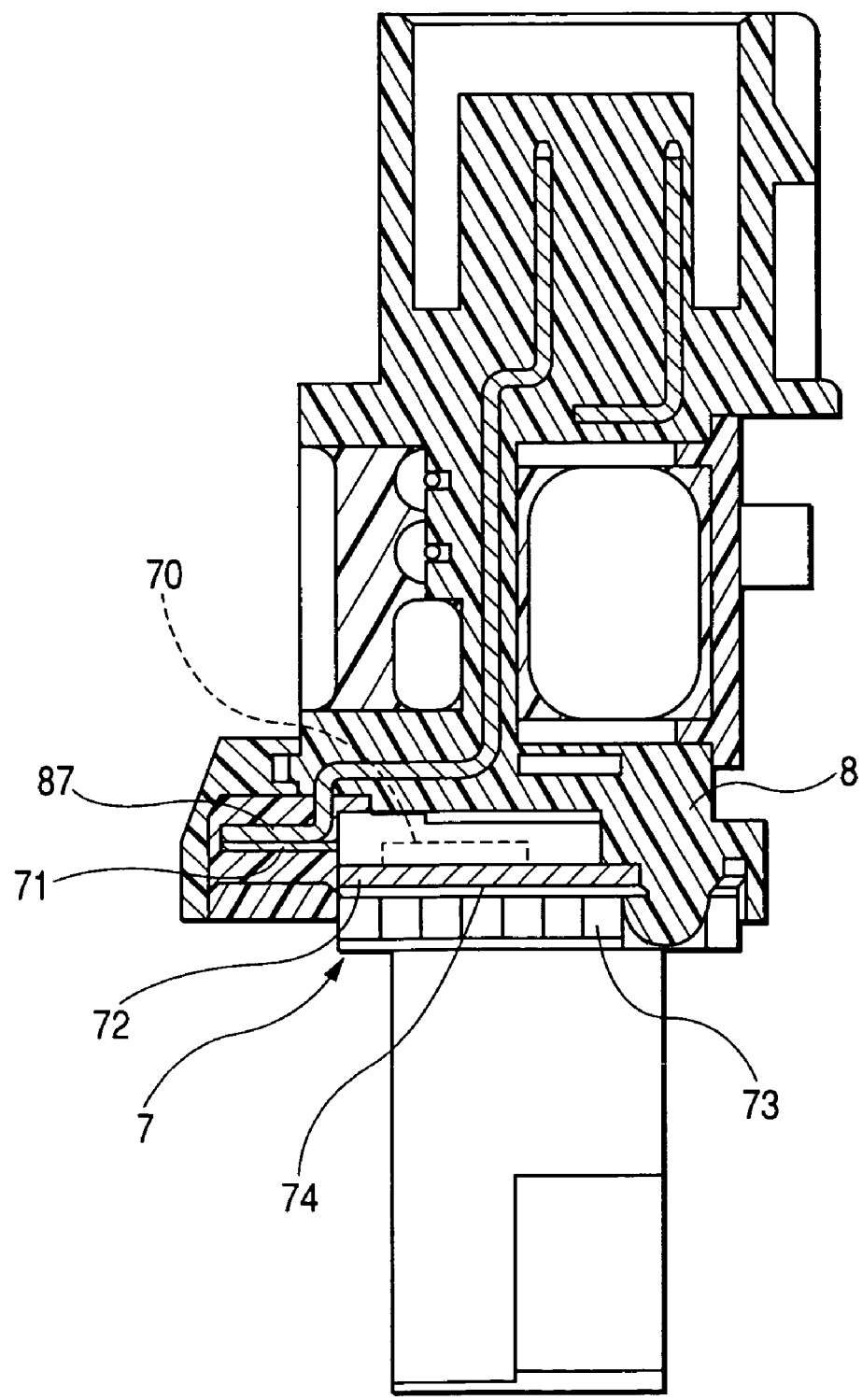
FIG. 3 is a sectional view of a detailed configuration of a regulator incorporated into the vehicle alternator shown in FIG. 1.

FIG. 3 is a sectional view of a detailed configuration of the regulator incorporated into the vehicle alternator 1 shown in FIG. 1. FIG. 4 is a side view of the regulator in the vehicle alternator 1 shown in FIG. 3. FIG. 5 is a front view of the regulator in the vehicle alternator 1 shown in FIG. 3.

As shown in FIG. 2 to FIG. 5, the regulator case 7 is composed of switching elements for controlling an exciting current, a monolithic integrated circuit chip 70 as a regulator substrate having various electric circuits, plural external connection terminals 71, and a regulator heat sink 72.

On the monolithic integrated circuit chip 70, the switching elements and a control circuit for performing ON/OFF operation of the switching elements are integrally formed. One end of each of the plural external connection terminals 70 is connected to the monolithic integrated circuit chip 70 and the other terminal of each of the plural external connection terminals 70 is exposed to the outside of the regulator case 7. The monolithic integrated circuit chip 70 is mounted on one surface of the regulator heat sink 72.

The regulator case 71 is made in a thin film shaped body by an integrated mold formation process. The other surface (which is the opposite side of the surface on which the monolithic integrated circuit chip 70 is mounted) of the regulator heat sink 72 is connected to the regulator cooling fin part 73 having plural cooling fins by the silicon adhesive 74.

One surface of the regulator cooling fin part 73 is flat, which is faced to the regulator heat sink 72, and the other surface of the regulator cooling fin part 73 is uneven, on which plural projection parts such as plural cooling fins are formed. The radiation of heat of the regulator is promoted through the plural projection parts (or the plural cooling fins). The regulator case 7 is tightly fastened to a regulator support part 86 as a part of the connector case 8. That is, the regulator case 7 is projected toward the inside of the connector case 8. The uneven surface of the regulator fin part 73, on which the plural projection parts (or the plural cooling fins) are formed, is elongated toward the inside of the radial direction of the vehicle alternator 1 along the rotation axis of the rotor 3 of the vehicle alternator 1.

The external connection terminals 71 are electrically connected to the connection terminals 87 projected from the connector case 8 by welding.

One of the important features of the present invention is that the regulator heat sink 72 and the regulator cooling fin part 73 are made of a same material so as to have a superior thermal expansion coefficient. In concrete example, both the regulator heat sink 72 and the regulator cooling fin part 73 are made of copper or copper alloy of a superior thermal expansion coefficient in order to suppress the temperature rise of the monolithic integrated circuit chip 70 by heating therein.

Although the regulator heat sink 72 is not exposed to the outside and on the contrary, the uneven surface of the regulator cooling fin part 73 is exposed to the outside, it is preferred to perform the surface treatment for the uneven surface of the regulator cooling fin part 73 which are exposed to the outside, in order to enhance the corrosion-resistance (or anti-corrosion) capability of the uneven surface.

EXPERIMENTAL RESULTS

A description will now be given of the experimental results of thermal cycle testing for the vehicle alternator of the present invention and a related art vehicle alternator.

Figure 6:
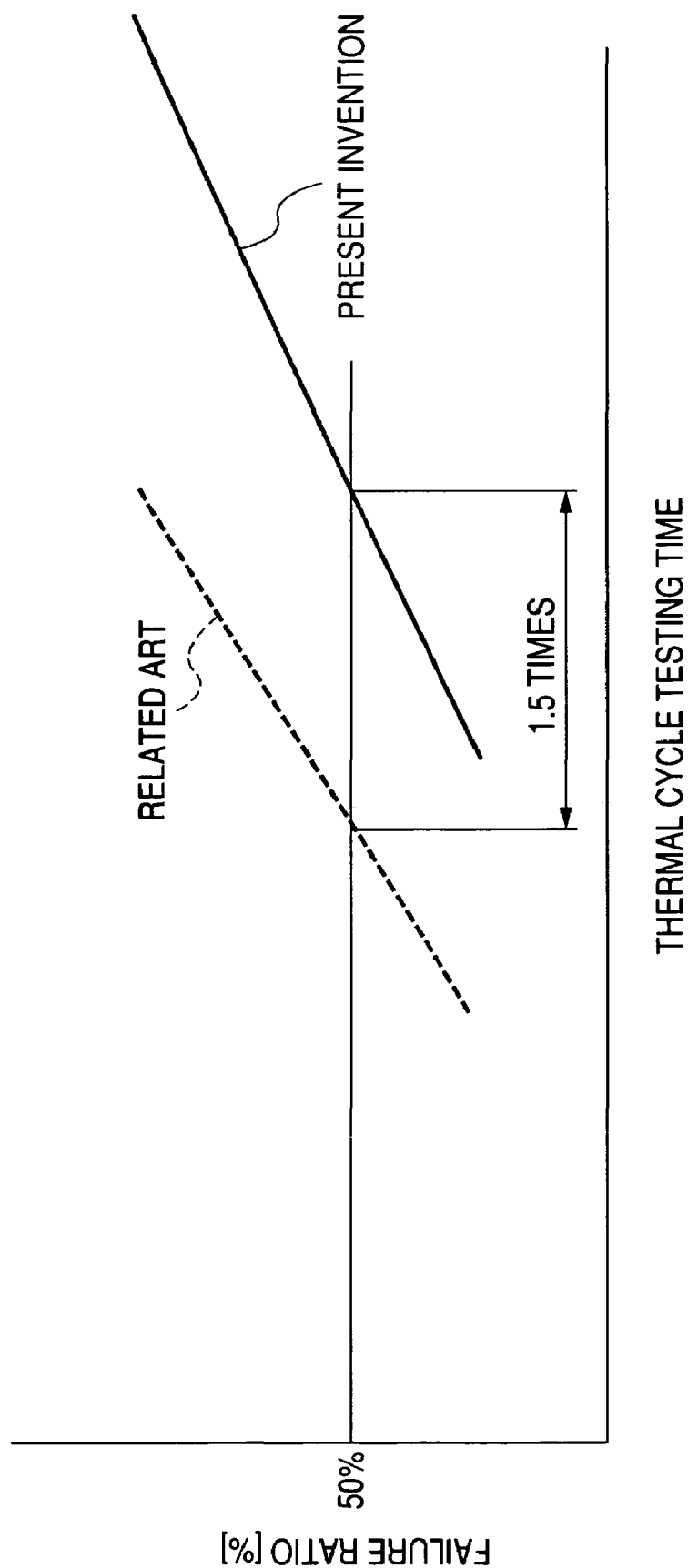
FIG. 6 shows a comparison result of thermal cycle testing between the present invention and a related art.

FIG. 6 shows the comparison result of the thermal cycle testing of the vehicle alternator between the present invention and the related art.

The regulator heat sink 72 and the regulator cooling fin part 73 of the regulator incorporated into the vehicle alternator 1 of the present invention are made of a same material, in particular, made of copper or copper alloy. On the contrary, the regulator heat sink and the regulator cooling fin part in the related-art vehicle alternator are made of different materials, for example, the regulator heat sink is made of copper or copper alloy, and the regulator cooling fin part is made of aluminum.

As shown in FIG. 6, at the failure ratio of 50% the thermal cooling testing time of the vehicle alternator 1 according to the present invention designated by the solid line is approximately 1.5 times of the thermal cooling testing time of the related-art vehicle alternator designated by the dotted line. This thermal cooling testing time is the time to reach the same failure ratio designated by the solid line that is in parallel to the horizontal tine.

Figure 7:
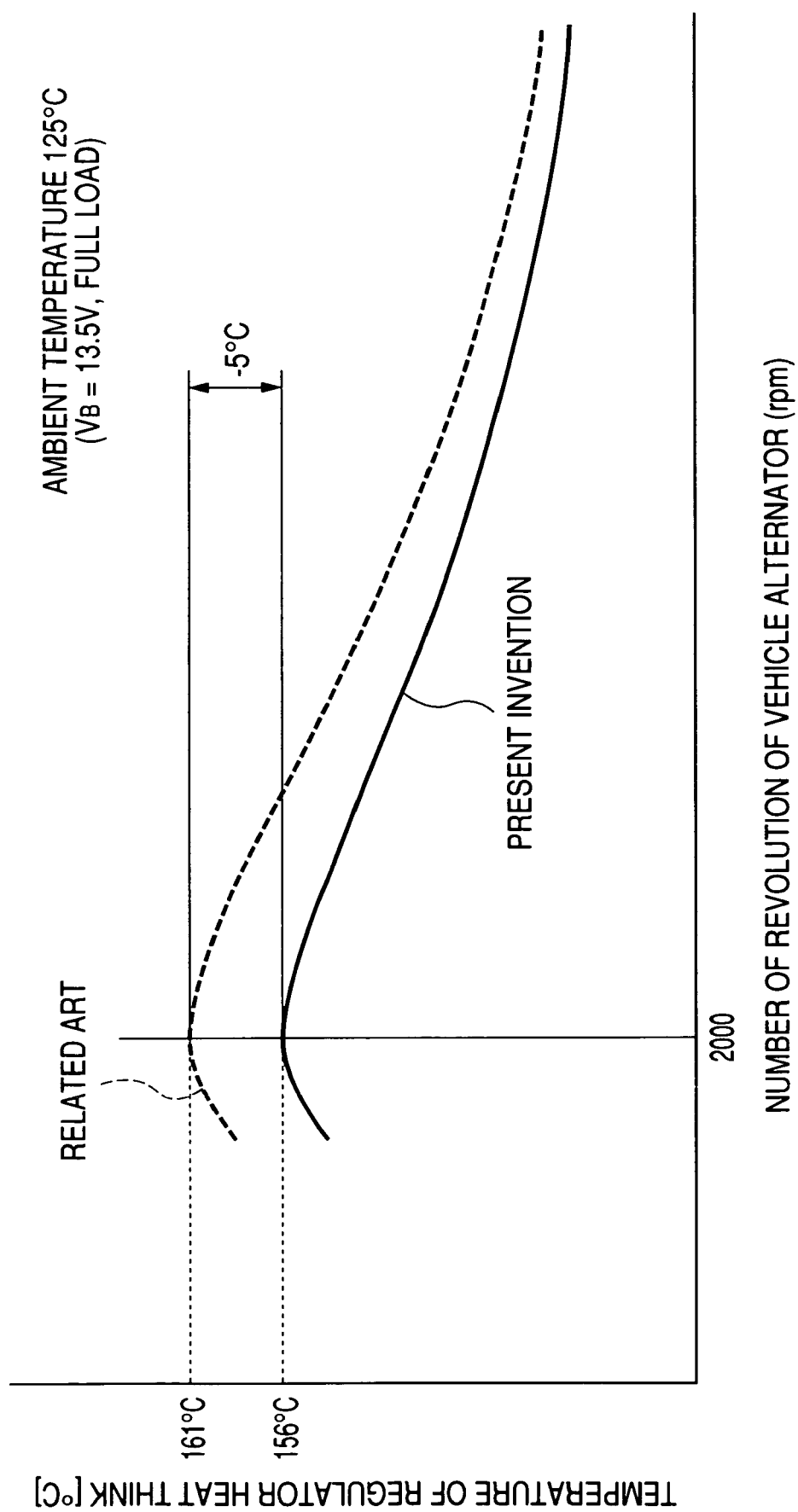
FIG. 7 shows a comparison result of temperature rise of a heat sink in a regulator of a vehicle alternator between the present invention and a related art.

FIG. 7 shows the comparison result of the temperature rise of the regulator heat sink in the regulator of the vehicle alternator between the present invention and the related art under the conditions of a full load, the output voltage VB=13.5 V of the vehicle alternator, and at the ambient temperature of 125° C.

As shown in FIG. 7, the peak temperature of the regulator heat sink 72 of the vehicle alternator 1 according to the present invention is 156° C. at 2000 r.p.m, and on the contrary, the peak temperature of the regulator heat sink 72 in the vehicle alternator of the related art is 161° C. at 2000 r.p.m.

Thus, the present invention can reduce the peak temperature of the regulator heat sink 72 by approximately 5° C. when compared with the peak temperature of the related art vehicle alternator.

Similar to the case shown in FIG. 6, the regulator heat sink 72 and the regulator cooling fin part 73 of the regulator incorporated into the vehicle alternator 1 according to the present invention are made of a same material, in particular, made of copper or copper alloy.

On the contrary, the regulator heat sink and the regulator cooling fin part in the related-art vehicle alternator are made of different materials, for example, the regulator heat sink is made of copper or copper alloy, and the regulator cooling fin part is made of aluminum.

As described above, according to the vehicle alternator 1 of the present invention, both the regulator heat sink 72 and the regulator cooling fin part 73 are made of a same material, such as copper or copper alloy, having a superior same thermal expansion coefficient.

Even if the thermal stress caused by a large temperature change is applied to the regulator heat sink 72 and the regulator cooling fin part 73 by the change of the generation state of the electric power in the vehicle alternator 1 or by the change of operation state of the engine (omitted from the drawings) mounted on a vehicle, the configuration of both the regulator heat sink 72 and the regulator cooling fin part 73 made of the same material can reduce the thermal stress applied to the silicon adhesive 74 as a bonding agent for bonding the regulator cooling fin part 73 to the regulator heat sink 72. This feature maintains the good connection between the regulator heat sink 7 and the regulator cooling fin part 73 over a long time and thereby enhances the reliability of the vehicle alternator 1 of the embodiment according to the present invention.

In particular, because both the regulator heat sink 72 and the regulator cooling fin part 73 are made of only one of copper and copper alloy having a superior thermal conductivity, it is possible to reduce the thermal stress to be applied between them and to increase the cooling capability, and as a result to increase the reliability of the vehicle alternator 1. In other words, the vehicle alternator 1 of the embodiment according to the present invention is capable of drastically increasing the cooling capability.

In addition, the concept of the present invention can be applied to a large-sized vehicle alternator in which the outer diameter of a stator is not less than 152 mm and a rated output thereof is 2.4 kW or more while certainly maintaining the connection state between the regulator heat sink and the regulator cooling fin part that are tightly bonded. Thus, the present invention provides the vehicle alternator of a high output power at an improved reliability.

The concept of the present invention is not limited by the above disclosure and can be realized by various modifications. For example, although the embodiment described above uses the silicon adhesive 74 as bonding agent for bonding the regulator cooling fin part 73 to the regulator heat sink 72, it is acceptable to use another adhesive other than the silicon adhesive in consideration of the working temperature and durability of the vehicle alternator.

Further, according to the embodiment of the present invention, although both the regulator heat sink 72 and the regulator cooling fin part 73 are made of copper or copper alloy, it is possible to use aluminum or aluminum alloy instead of copper or copper alloy when the vehicle alternator operates under a relatively low temperature.

Still further, according to the embodiment of the present invention, although both the regulator heat sink 72 and the regulator cooling fin part 73 are made of a same material such as copper or copper alloy, it is possible that both the regulator heat sink 72 and the regulator cooling fin part 73 can be made of different materials so long as the different materials have approximately same thermal expansion coefficient.

In addition, in the embodiment, the present invention is applied to a large-sized vehicle alternator 1 in which the outer diameter of the rotor 2 is not more than 152 mm and its rated output voltage is 2.4 kW or more. The present invention is not limited by the embodiment. It is possible to apply the concept of the present invention to a small-sized vehicle alternator.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalent thereof.

What is claimed is:

1. A vehicle alternator for generating electric power comprising:
   a stator on which a stator winding is wound;
   a rotor placed on opposite faces to the stator;
   a rectifier for rectifying an alternating current output voltage excited in the stator winding;
   a regulator case accommodating a regulator substrate for adjusting the output voltage and a heat sink having a first surface and a second surface, the first surface of the heat sink mounted to the regulator substrate; and a cooling fin part having a plurality of cooling fins bonded to the second surface of the heat sink, the cooling fin part being bonded to the heat sink by an adhesive, wherein the cooling fin part and the heat sink are made of different materials of a same thermal expansion coefficient.

2. The vehicle alternator according to claim 1, wherein the cooling fin part is made of one of copper and copper alloy and the heat sink is made of the other of copper and copper alloy.

3. The vehicle alternator according to claim 2, wherein: an outer diameter of the stator is not more than 152 mm, and a rated output power of the vehicle alternator is not less than 2.4 kW.

4. The vehicle alternator according to claim 1, wherein an outer diameter of the stator is not more than 152 mm, and a rated output power of the vehicle alternator is not less than 2.4 kW.

* * * * *